(12) United States Patent
Uchida et al.

(10) Patent No.: US 7,699,950 B2
(45) Date of Patent: Apr. 20, 2010

(54) RUBBER/RESIN ULTRASONIC BONDING METHOD

(75) Inventors: Yasunori Uchida, Nishikasugai-gun (JP); Masao Ashibe, Nishikasugai-gun (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 1028 days.

(21) Appl. No.: 11/411,911

(22) Filed: Apr. 27, 2006

(65) Prior Publication Data
US 2006/0249241 A1 Nov. 9, 2006

(30) Foreign Application Priority Data
Apr. 28, 2005 (JP) ............................. 2005-131669

(51) Int. Cl.
*B32B 37/00* (2006.01)
(52) U.S. Cl. ....................................... 156/73.1; 156/64
(58) Field of Classification Search .................. 156/64, 156/73.1, 358, 359, 580.1, 580.2
See application file for complete search history.

(56) References Cited

FOREIGN PATENT DOCUMENTS

| CN | 1285460 C | | 12/2004 |
| CN | 1557628 | * | 12/2004 |
| GB | 52-123475 | | 11/1980 |
| JP | A-H05-99266 | | 4/1993 |
| JP | 2001275751 | * | 10/2001 |
| JP | A-2001-275751 | | 10/2001 |
| JP | 2003-311210 | | 11/2003 |

OTHER PUBLICATIONS

Office Action dated May 30, 2008 in corresponding Chinese patent application No. 200610076529.7 (and English translation).

* cited by examiner

*Primary Examiner*—James Sells
(74) *Attorney, Agent, or Firm*—Posz Law Group, PLC

(57) ABSTRACT

A roughened rubber bonding surface having a predetermined roughness of a rubber member and a roughened resin bonding surface having a predetermined roughness of a resin member made of a thermoplastic resin are connected to constitute a bonding interface, and ultrasonic vibrations are applied to the bonding interface from the rubber member side. Only the resin member is fused by friction heat generated in the bonding interface so as to force fused resin into the rubber member, and the fused resin that has been so forced into the rubber member is solidified therein, whereby both the rubber member and the resin member are mechanically bonded by virtue of an anchoring effect produced by the two members which are entangled together.

13 Claims, 3 Drawing Sheets

RUBBER/RESIN ULTRASONIC BONDING METHOD

BACKGROUND OF THE INVENTION

1. Field of the Invention

The present invention relates to a rubber/resin ultrasonic bonding method, and more particularly to a rubber/resin ultrasonic bonding method in which a bonding surface of a rubber member and a bonding surface of a resin member whose fusion point is lower than that of the rubber member are connected to constitute a bonding interface and the resin member is fused by friction heat generated by application of ultrasonic vibrations to the bonding interface from the rubber member side, so as to bond both the members.

2. Related Art

Conventionally, for example, when attaching a rubber member to a resin member, an affixing method using a pressure sensitive adhesive double coated tape and a resin pin crimping method in which a resin pin provided on a resin member is passed through a hole in a rubber member so as to be crimped at a distal end thereof have been in use.

In addition, a vulcanizing adhesion method is also known in which a bonding surface of a resin member is embossed when molding the resin member, so that a rubber member can be bonded to the bonding surface of the resin member so embossed when vulcanized (for example, refer to JP-A-5-99266).

On the other hand, although it is not a bonding method for bonding a rubber member and a resin member, an ultrasonic welding method is also known for welding a hard resin member and a soft member made of a thermoplastic elastomer of the same resin base as the hard resin member using ultrasonic vibrations (for example, refer to JP-A-2001-275751).

In this ultrasonic welding method, a bonding surface of a hard resin member made of polypropylene (PP) is connected to a bonding surface of a soft member made of a olefin based plastic elastomer having compatibility with PP and a Shore A hardness (JIS-A hardness) of 90 or greater so as to form a bonding interface, and both the members are fused by friction heat generated in the bonding interface by application of ultrasonic vibrations to the bonding interface from the oft member side, whereby both the members are fusion bonded by chemical bonding force generated by molecular bond.

The conventional methods have their respective problems as below.

Namely, in the affixing method using a pressure sensitive adhesive double coated tape, the production costs are increased by such an extent that the pressure sensitive adhesive double coated tape is used. In addition, since the adhesive double coated tape made of a different material remains on the bonding interface, there occurs a case to which this method cannot be applied.

In addition, in the resin pin crimping method, both the resin member and the rubber member need to be molded with high accuracy so that the thickness and position of the resin pin on the resin member can accurately match the diameter and position of the hole in the rubber member, this also leading to high costs.

Furthermore, in the rubber vulcanizing adhesion method, since the rubber member needs to be vulcanized for adhesion to the resin member while being vulcanized to be molded into a predetermined shape in such a state that the resin member, which has been molded into a predetermined shape in advance, is disposed at a predetermined position in a rubber vulcanizing and molding mold, a mold having a special and complex construction is necessary as the vulcanizing and molding mold, this also resulting in high mold fabricating costs.

On the other hand, in the ultrasonic welding method, this is really the method in which members of the same resin base which are compatible with each other are fused together so as to be fusion bonded by chemical bonding force, and a rubber member and a resin member cannot be bonded by this method.

SUMMARY OF THE INVENTION

The invention was made in view of the situations, and a technical problem that is to be solved by the invention is how to provide a method which obviates the necessity of interposing a material of different kind such as the pressure sensitive adhesive double coated tape on the bonding interface or molding two members to be bonded with high accuracy and which enables molding using a general purpose mold without using the mold having the special and complex structure, to thereby bond a rubber member and a resin member at low costs.

With a view to solving the problem, according to a first aspect of the invention, there is provided an ultrasonic bonding method for bonding a rubber member having a roughened rubber bonding surface of a predetermined roughness and a resin member made of a thermoplastic resin having a roughened resin bonding surface of a predetermined roughness, comprising:

setting the rubber member and the resin member to form a bonding interface therebetween by connecting the roughened rubber bonding surface and the roughened resin bonding surface (setting step);

applying ultrasonic vibrations to the bonding interface from a side of the rubber member to thereby fuse only the resin member by friction heat generated in the bonding interface and to thereby force fused resin into the rubber member (resin fusing step); and solidifying the fused resin to mechanically bond the rubber member and the resin member by imparting an anchoring effect produced by entanglement of the rubber member and the resin member in the bonding interface (resin solidifying step).

In the ultrasonic bonding method of the invention, in the resin fusing step, only the resin member is fused by application of ultrasonic vibrations to the bonding interface from the rubber member side. In the invention, as this occurs, the following function and advantage will be provided since the bonding surfaces of the rubber member and the resin member which make up the bonding interface to be ultrasonic bonded are made to be the roughened rubber bonding surface and roughened resin bonding surface which have their respective predetermined roughnesses.

Namely, in the resin fusing step in which ultrasonic vibrations are applied to the bonding interface from the rubber member side, at the bonding interface, only peak portions on the roughened resin bonding surface are partially in pressure contact with the roughened rubber bonding surface or the peak portions on the roughened resin bonding surface are brought into higher pressure contact with the roughened rubber bonding surface than valley portions. Due to this, a large stress is generated between the peak portions on the roughened resin bonding surface and the roughened rubber bonding surface which is brought into contact with the peak portions, and vibration energy is transmitted more preferentially to the peak portions than to the valley portions on the roughened resin bonding surface. As a result, a time difference in fusion period is generated on the roughened resin bonding surface between the peak portions and the valley portions, and hence, at an initial fusion stage where at least the resin member starts to be fused, the valley portions are not fused but only the peak portions are fused by friction heat. In addition, in this roughened resin bonding surface, depending on an applied pressure that is applied to the bonding interface with the roughened rubber bonding surface, a forced amount into the rubber member and oscillation time of ultrasonic vibration, the valley portions are not fused but the whole or part of peak portions are fused, or the whole or part of peak portions and the whole or part of valley portions are fused. Thus, fused resin which is produced in the roughened resin bonding surface due to the peak portions being fused earlier than the valley portions enters the inside of the rubber member or recessed portions existing on the roughened rubber bonding surface. Then, since there is no way for fused resin that has entered the recessed portions on the rubber member to escape in the rubber member, the rubber member itself is pushed and forced to submerge into the valley portions which are not fused yet while the rubber member itself is being deformed elastically. Thus, a state is generated in the bonding interface in which the fused resin enters the rubber member sufficiently, and by cooling the fused resin so as to be set in this state, both the members can be bonded mechanically by virtue of an anchoring effect between the rubber member and the resin member which are entangled sufficiently in the bonding or now bonded interface.

In addition, since the roughened rubber bonding surface and the roughened resin bonding surface which make up the bonding interface are roughened, the contact area between the resin member and the rubber member at the bonding interface is reduced. Due to this, vibration energy can be converted into thermal energy with good efficiency at the bonding interface, this enabling ultrasonic bonding with low energy.

Here, with an increase in evenness in the roughened resin bonding surface, the time difference in fusion period between the peak portions and the valley portions becomes small, whereby almost the whole of the roughened resin bonding surface is fused almost at the same time. Then, the aforementioned anchoring effect by the entanglement between the rubber member and the resin member cannot be exhibited sufficiently in the bonding interface.

Then, according to a second aspect of the invention, the roughened resin bonding surface is given a degree of surface roughness of Rz5 to 300 μm as surface roughness. Thus, in the event that the roughened resin bonding surface is roughened with the predetermined surface roughness, the anchoring effect can be increased so as to increase, in turn, the bonding strength.

Consequently, according to the rubber/resin ultrasonic bonding method, there is no need to interpose the material of different kind such as the pressure sensitive adhesive double coated tape at the bonding interface or to mold two members to be bonded with high accuracy. In addition, it becomes possible to mold a rubber member and a resin member using a general purpose mold without using the mold having the special and complex construction. Consequently, the rubber member and the resin member can be bonded at low costs.

DETAILED DESCRIPTION OF THE PREFERRED EMBODIMENTS

Figure 1:
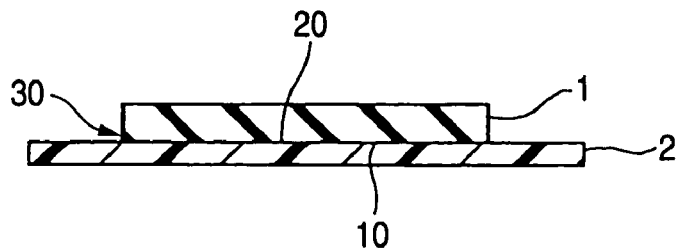
FIG. 1 is a sectional view which shows a state in which a rubber member and a resin member are bonded through ultrasonic bonding according to an embodiment of the invention.

In a rubber/resin ultrasonic bonding method of the invention, a rubber member and a resin member made of a thermoplastic resin are ultrasonic bonded.

The rubber member is not limited to any special kind, but the following synthetic rubbers and natural rubber (NR) can be used; the former including ethylene propylene (EPDM), styrene butadiene (SBR), butyl rubber (IIR), nitril rubber (NBR), chloroprene rubber (CR), acrylic rubber, urethane rubber, silicone rubber, fluororubber and the like.

In the event that the hardness of the rubber member is too high, there is caused a risk where the anchoring effect resulting from the entanglement of the rubber member and the resin member cannot be exhibited sufficiently. In contrast, the hardness of the rubber member is too low, the ultrasonic vibration is dampened by the rubber member, leading to a risk where the fusion of resin is interrupted. Due to this, the hardness of the rubber member is preferably in the range of Hs50 to 80 as measured by Shore A hardness (JIS-A hardness), and more preferably, in the range of Hs60 to 70 as measured by Shore A hardness (JIS-A hardness).

The resin member is not limited to any special kind, as long as a thermoplastic resin is used which can be fused by ultrasonic vibrations applied to the bonding interface from the rubber member side, and it is possible to appropriately select for use from PP (polypropylene), PE (polyethylene), PA (polyamide), PVC (polyvinyl chloride), POM (polyacetal), PS (polystyrene), PPS (polyphenylene sulfide), and ABS (acrylonitrile butadiene rubber).

There is no specific limitation on the shapes and sizes of the rubber member and the resin member, and hence, the shapes and sizes can be set arbitrarily. In addition, there is no specific limitation on molding methods of the rubber member and the resin member, and hence, the rubber member and the resin member can be molded using a normal method such as an injection molding or an extrusion while using a general purpose mold.

From the viewpoint of increasing the bonding strength, however, the rubber thickness in an oscillating direction of ultrasonic vibrations applied to the bonding interface from the rubber member side is preferably in the range of 0.5 to 5 mm, and more preferably in the range of 0.7 to 1.0 mm. In the event that the rubber thickness in the oscillating direction is too thick, an amount of vibration energy of ultrasonic vibration that is to be dampened within the rubber member is increased, and hence, vibration energy to be applied to the bonding interface becomes short, leading to insufficient fusion of resin. In contrast, in the event that the rubber thickness in the oscillating direction is too thin, the infiltration of fused resin into the rubber member becomes insufficient, resulting in a reduction in anchoring effect.

In addition, in the rubber/resin ultrasonic bonding method of the invention, both the rubber member and the resin member have a roughened rubber bonding surface and a roughened resin bonding surface, respectively, which have their respective predetermined roughnesses.

Since fused resin is not allowed to enter recessed portions on the roughened rubber bonding surface with an increase in evenness in the roughened rubber bonding surface, the aforesaid anchoring effect by virtue of the entanglement of the rubber member and the resin member cannot be exhibited sufficiently in the bonding interface. Then, from the viewpoint of increasing the anchoring effect to thereby enhance the bonding strength, the roughened rubber bonding surface is preferably made to have a mesh size of 100 or less, and more preferably, a mesh size of 60 or less. Note that the roughened rubber bonding surface has the mesh size of 100 or less means that the roughened rubber bonding surface has a degree of surface roughness that is transferred by a mold to which a blast finishing is applied to realize a mold roughness having a mesh size of 100 or less, and that the roughened rubber bonding surface has the mesh size of 60 or less means similarly that the roughened rubber bonding surface has a degree of surface roughness that is transferred by a mold to which a blast finishing is applied to realize a mold roughness having a mesh size of 60 or less.

There is no specific limitation on a forming method of the roughened rubber bonding surface. For example, when molding a rubber member, a predetermined blast finishing is applied to a mold surface which molds a roughened rubber bonding surface. Thus, a roughened rubber bonding surface having a predetermined roughness can be formed by applying such a surface finishing to the relevant mold surface.

From the viewpoint of increasing the anchoring effect to thereby enhance the bonding strength, the roughened resin bonding surface is preferably given a degree of surface roughness of Rz5 to 300 μm as surface roughness, is more preferably given a degree of surface roughness of Rz10 to 100 μm as surface roughness, and is particularly preferably given a degree of surface roughness of Rz10 to 50 μm as surface roughness. In the event that the surface roughness of the roughened resin bonding surface becomes less than Rz5 μm, as has been described before, since the time difference in fusion period between the peak portions and the valley portions becomes small, the aforesaid anchoring effect cannot be exhibited sufficiently.

While there is no specific limitation on a forming method of the roughened resin bonding surface, preferably, by embossing a surface of a resin member which constitutes a roughened resin bonding surface thereof, a roughened resin bonding surface with a predetermined surface roughness can be formed. There is no specific limitation on embossed patterns that are formed by the embossing process, and a resulting roughened resin bonding surface can be finished with a lattice, leather, wood grain, stone grain, satin finish or geometrical pattern. In addition, the embossing processing means a processing in which by molding a resin member using a mold in which an embossed irregular surface is provided on a surface of the mold, an embossed irregular surface is formed on a bonding surface of the resulting resin member. In addition, for example, that an embossing processing of 30 μm is applied means that an embossing processing is applied such that an average pitch (a distance between centers of adjacent valley portions (or adjacent peak portions)) between adjacent valley portions (or adjacent peak portions) becomes 30 μm, and an average depth from a reference plane of each valley portion and an average height from a reference plane of each peak portion become 30 μm, respectively.

The rubber/resin ultrasonic bonding method of the invention includes a setting step, a resin fusing step and a resin solidifying step.

In the setting step, the roughened rubber bonding surface of the rubber member and the roughened resin bonding surface of the resin member are connected so as to constitute a bonding interface. As this occurs, for example, the roughened rubber bonding surface and the roughened resin bonding surface are connected, and in order to hold this state, both the members can be fixed to each other using a jig or the like.

In the resin fusing step, only the resin member is fused by friction heat generated in the bonding interface by applying ultrasonic vibrations to the bonding interface from the rubber member side, so as to force fused resin into the rubber member.

There is no specific limitation on the method for applying ultrasonic vibrations, and hence, for example, a commercially marketed ultrasonic bonding machine can be used. In addition, there is no specific limitation on conditions used as this occurs such as applied pressure, forced amount, ultrasonic vibration oscillation time, oscillation frequency and amplitude, and hence, such conditions can be set appropriately. For example, an applied pressure applied to the bonding interface can be in the order of 0.03 to 0.35 MPa, and it is preferably set to be in the order of 0.2 to 0.3 MPa. In the event that this applied pressure is too small, since the amount of fused resin that infiltrates the rubber member is reduced, there may be caused a risk where a sufficient bonding strength cannot be obtained. In contrast, in the event that the applied pressure is too large, there may be caused a risk where no ultrasonic vibration can be oscillated or the rubber member is damaged. In addition, the forced amount relative to the rubber member (an amount of fused resin that is forced into the rubber member) can be in the order of 0.2 to 1.4 mm and is preferably in the order of 0.4 to 0.9 mm. In the event that this forced amount is too small, since the infiltration of fused resin into the rubber member is reduced, there may be caused a risk where a sufficient bonding strength cannot be obtained. In contrast, in the event that the force amount is too large, there may be caused a risk where fused resin is forced out of the bonding interface to cause burrs or no oscillation can be effected. In addition, the oscillation time can be in the order of 0.2 to 1.0 second, and is preferably in the order of 0.35 to 0.6 second. In the event that this oscillation time is too short, since an amount of fused resin is decreased, there may be caused a risk where a sufficient bonding strength cannot be obtained. On the contrary, in the event that the oscillation time is too long, there may be caused a risk where fused resin is forced out of the bonding interface to cause burrs or sink marks (pinholes) are generated on the surface of the rubber member.

In the resin solidifying step, the fused resin that has entered the rubber member is solidified, so that both the members are mechanically bonded by the anchoring effect produced by the rubber member and the resin member which are entangled on the bonding or now bonded interface. This resin solidifying step can be performed by holding a state resulting after the resin member has been fused in the previous resin fusing step for on the order of 0.5 to 1.0 second.

EMBODIMENTS

Hereinafter, specific embodiments of rubber/resin ultrasonic bonding methods of the invention will be described.

Embodiment 1

A plate-shaped rubber member 1 (8 mm×40 mm, rubber thickness: 1.0 mm) was molded from EPDM through vulcanization molding using a vulcanization mold. As this occurred, the whole external surfaces of the rubber member 1 were given a degree of surface roughness of 100 or less as expressed by mesh size by applying a predetermined blast finishing to surfaces of the vulcanization mold. Note that in FIG. 1, a lower surface of the rubber member 1 was made to constitute a roughened rubber bonding surface 10 of 100 or less by expressed by mesh size.

On the other hand, a plate-shaped resin member 2 (120 mm×340 mm, plate thickness: 0.8 mm) was molded from PP through injection molding using an injection mold. As this occurred, an upper surface of the resin member 2 was made to constitute an embossed surface to which an embossing finishing of 35 μm was applied by providing an embossed irregular surface at a predetermined location on a surface of the injection mold. Thus, the upper surface of the resin member 2 was made into a roughened resin bonding surface 20 having a surface roughness of Rz35 μm.

Figure 2:
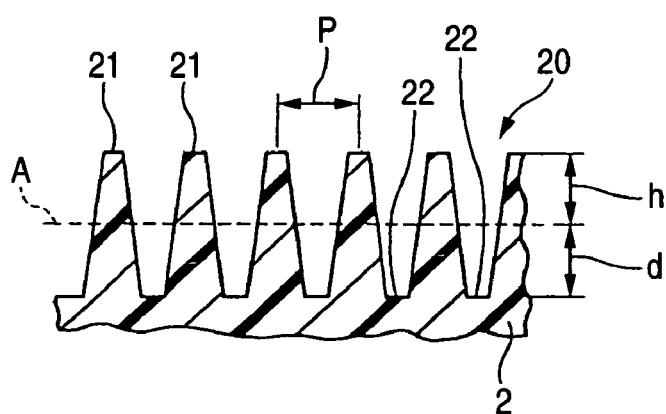
FIG. 2 is an partially enlarged sectional view which exemplarily shows a cross section of a roughened resin bonding surface of the resin member which is formed according to the embodiment of the invention.

On this roughened resin bonding surface 20, as is exemplarily shown in FIG. 2 which depicts a sectional view thereof, a plurality of peak portions 21 whose average height h from a reference plane A indicated by a dotted line is 35 μm and a plurality of valley portions 22 whose average depth d from the reference plane A is 35 μm are provided in an alternating manner. In addition, an average pitch P between adjacent peak portions 21 (a distance between centers of adjacent peak portions 21) and an average pitch P between adjacent valley portions 22 (a distance between centers of adjacent valley portions 22) are both made to be 35 μm. In addition, the valley portions 22 are formed over the entirety of roughened resin bonding surface 20 in a lattice-like manner.

Additionally, as shown in FIG. 1, the rubber member 1 was superposed on the upper surface of the resin member 2, and they were fixed in that state using a jig, not shown, whereby the roughened rubber bonding surface 10 of the rubber member 1 and the roughened resin bonding surface 20 of the resin member 2 were connected to thereby constitute a bonding interface 30.

The roughened rubber bonding surface 10 of the rubber member 1 and the roughened resin bonding surface 20 of the resin member 2 were ultrasonic bonded using a commercially marketed a 2-point horn type ultrasonic bonding machine (its trade name is "S-1200" manufactured by SEIDENSHA Co., Ltd.) while holding the set state, so as to obtain a rubber/resin bonded product. The aforesaid conditions then were those that will be described below. Note that under these conditions, the rubber member is not fused and only the resin member 2 is fused.

Applied Pressure: 0.07 MPa
Forced Amount: 0.4 mm
Oscillation Time: 0.15 sec
Oscillation Frequency 19.15±0.15 Hz
Amplitude: 18 μm

Embodiment 2

A rubber/resin bonded product was obtained through a similar ultrasonic bonding to that carried out in Embodiment 1 except that a roughened resin bonding surface 20 having a surface roughness of Rz10 μm was obtained by applying an embossing finishing of 10 μm to an upper surface of a resin member 2 to make the upper surface into an embossed surface as done in Embodiment 1.

COMPARISON EXAMPLE

A rubber/resin bonded product was obtained through a similar ultrasonic bonding to that carried out in Embodiment 1 was carried out except that a surface roughening processing through embossing as done in Embodiment 1 was not applied to an upper surface of a resin member 2 and hence a roughened resin bonding surface 20 of the resin member 2 was left as being an even resin bonding surface (a surface roughness of Rz1.2 μm).

(Evaluation of Bonding Strength)

Figure 3:
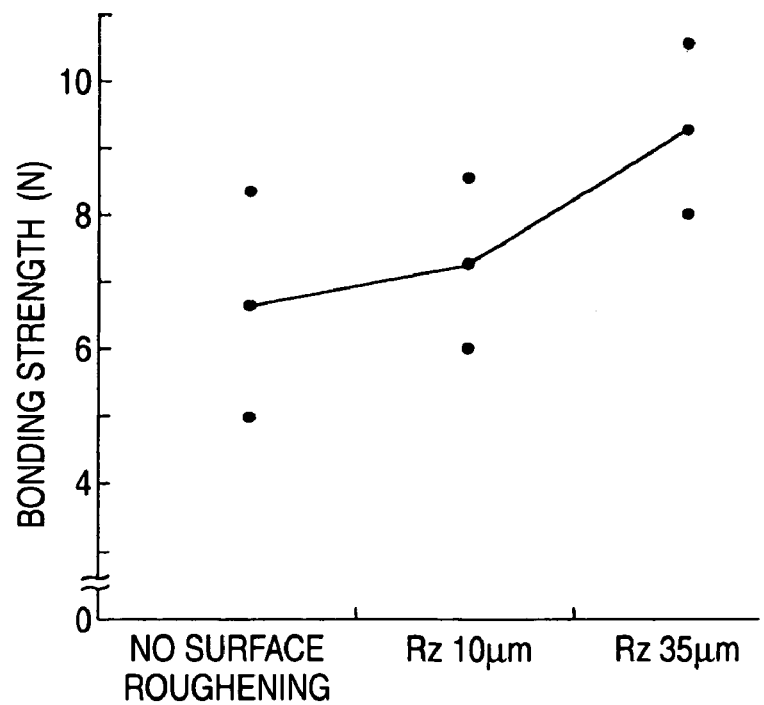
FIG. 3 is a graph showing a relationship between the surface roughness of the roughened resin bonding surface and bonding strength.

The rubber/resin products obtained through ultrasonic bonding in Embodiments 1, 2 and Comparison Example were evaluated with respect to bonding strength. The evaluation was carried out using a tension and compression testing machine AUTOGRAPH manufactured by IMADA SEISAKUSHO Co., Ltd.) under the following condition: speed: 10 mm/min. The results thereof are shown in Table 1 and FIG. 3.

TABLE 1

|  | Embodiment 1 | Embodiment 2 | Comparison Example |
|---|---|---|---|
| Surface Roughness | Rz35 μm | Rz10 μm | Rz1.2 μm |
| Bonding Strength | 8 to 10.60 N | 6 to 8.58 N | 5 to 8.36 N |

As is obvious from the results above, by applying the embossing finishing of 10 μm or greater to the bonding surfaces of the resin members 2 to produce the roughened resin bonding surfaces 20 having the surface roughnesses of Rz10 μm or greater, at least a bonding strength of 6N could be secured. In particular, in Embodiment 1 in which the embossing finishing of 35 μm, which was equal to or greater than 30 μm, was applied to the bonding surface of the resin member 2 to produce the roughened resin bonding surface 20 having the surface roughness of Rz35 μm, which was equal to or greater than Rz30 μm, there occurred a case where a bonding strength of 10 N or greater could be secured.

(Relationship between Rubber Thickness and Bonding Strength)

Figure 4:
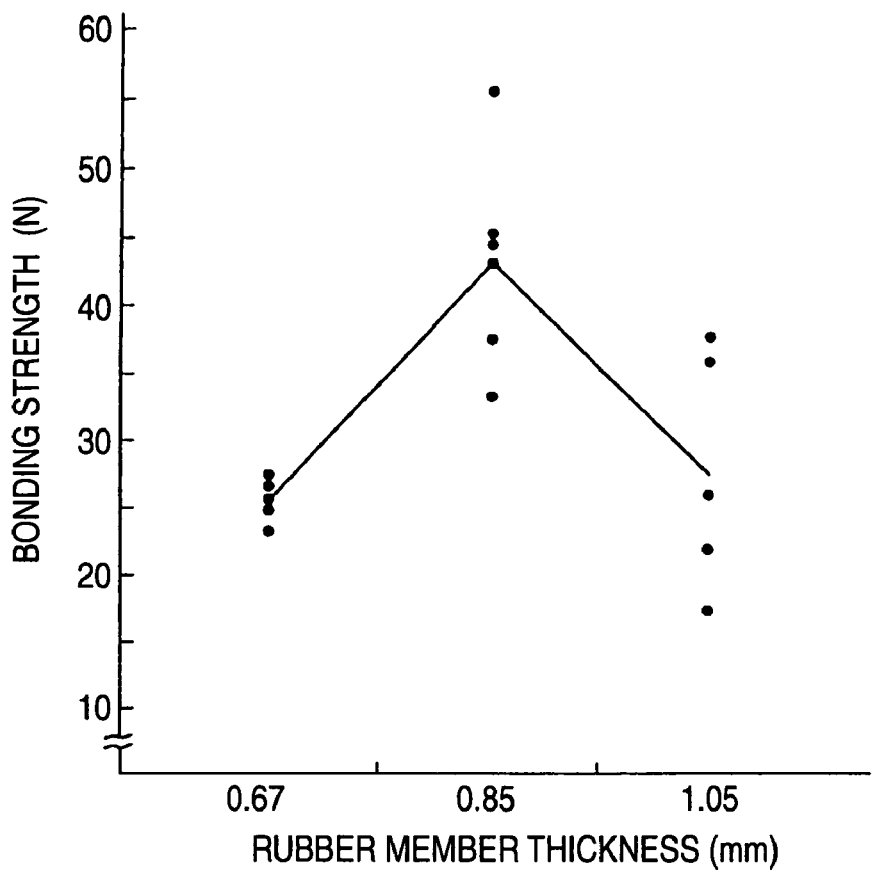
FIG. 4 is a graph showing a relationship between the rubber thickness of the rubber member and bonding strength.

In Embodiment 1, the thickness of the rubber member was changed from 0.67 to 0.85 mm and 1.05 mm, and ultrasonic bonding was carried out in the following conditions to investigate a relationship between rubber thickness and bonding strength. The results of the investigation are shown in Table 2 and FIG. 4.

Applied Pressure: 0.1 MPa
Forced Amount: 0.2 mm
Oscillation Time: 1.0 sec
Oscillation Frequency 19.15±0.15 Hz
Amplitude: 18 μm

TABLE 2

| | | Rubber Thickness (mm) | | |
|---|---|---|---|---|
| | | 0.67 | 0.85 | 1.05 |
| Bonding Strength (N) | n 1 | 27.3 | 44.68 | 17.01 |
| | 2 | 26.04 | 55.47 | 21.78 |
| | 3 | 23.32 | 33.12 | 35.83 |
| | 4 | 25.29 | 44.94 | 25.74 |
| | 5 | 24.95 | 37.51 | 37.74 |
| | Average | 25.38 | 43.14 | 27.62 |

As is obvious from the results, with the rubber thickness staying in the range from 0.67 to 1.05 mm, a bonding strength of 10N or greater could be secured with any thickness falling within the range. In addition, it is understood from the results that with rubber thicknesses in the range of 0.7 to 1.0 mm, the bonding strength can preferably enhanced further.

(Relationship between Ultrasonic Bonding Conditions and Bonding Strength)

Figure 5:
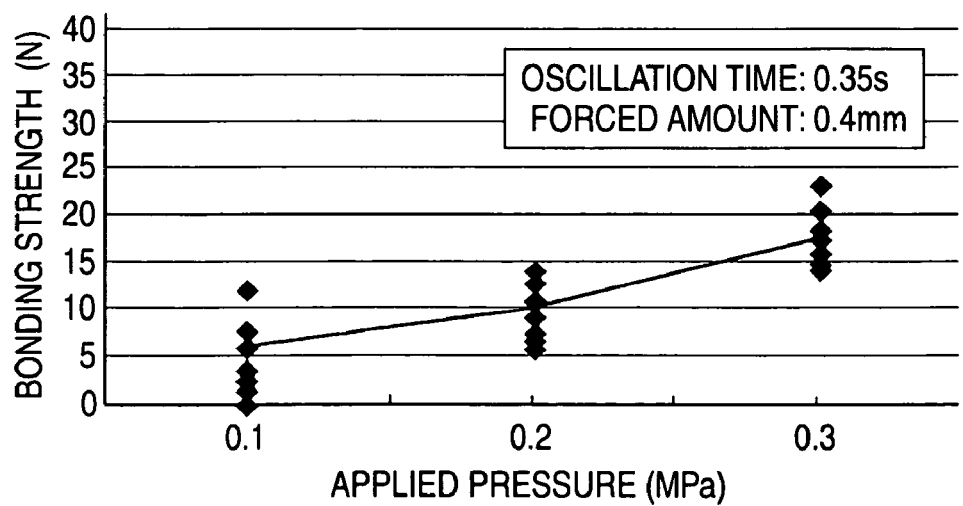
FIG. 5 is a graph showing a relationship between applied pressure and bonding strength at the time of ultrasonic bonding.
Figure 6:
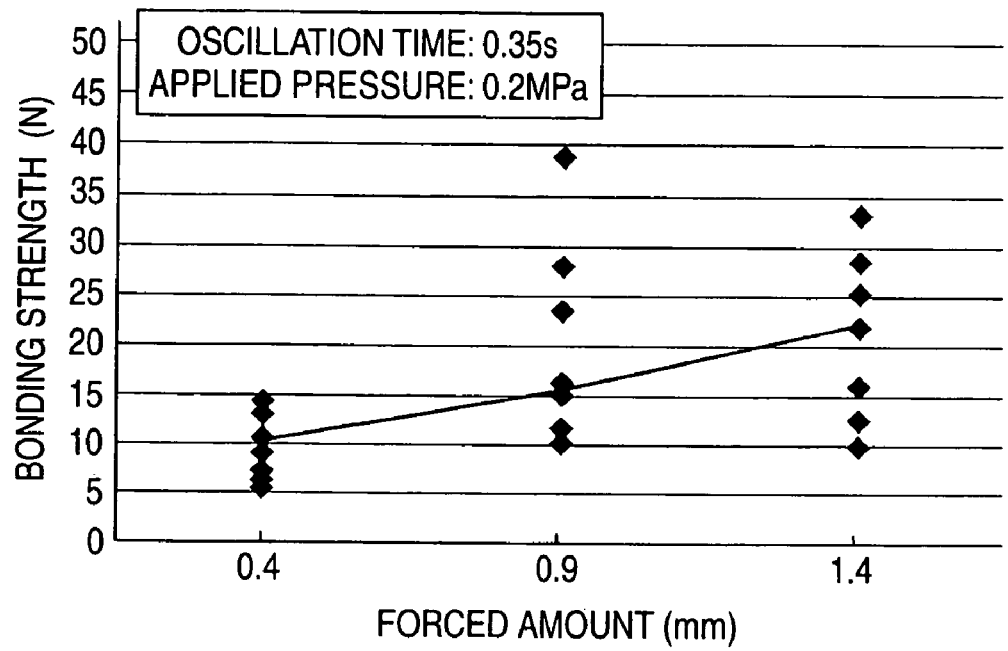
FIG. 6 is a graph showing a relationship between forced amount and bonding strength at the time of ultrasonic bonding.
Figure 7:
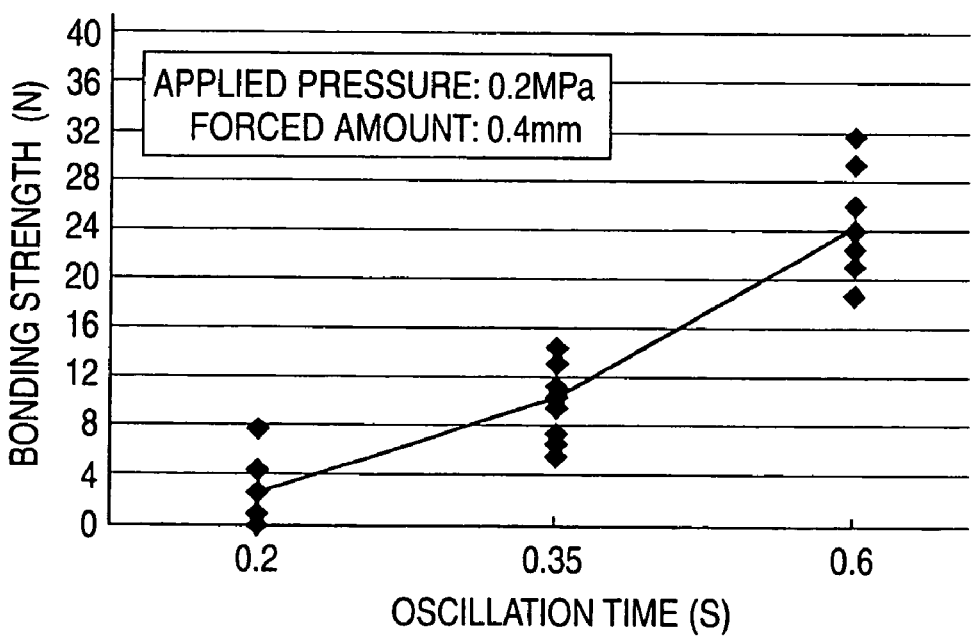
FIG. 7 is a graph showing a relationship between oscillation time and bonding strength at the time of ultrasonic bonding.

In Embodiment 1, the applied pressure, forced amount and oscillation time were individually and variously changed to investigate how the bonding strength was affected. The results of the investigation are shown in Table 3 and FIGS. 5 to 7.

TABLE 3

| | Oscillation Time (s) | Applied Pressure (MPa) | Forced Amount (mm) | Strength | External Appearance | Remarks |
|---|---|---|---|---|---|---|
| 1 | 0.2 | 0.2 | 0.4 | B or C | A | |
| 2 | 0.35 | 0.2 | 0.4 | C | A | |
| 3 | 0.60 | 0.2 | 0.4 | A or B | B | fused surface |
| 4 | 0.35 | 0.3 | 0.4 | A or B | A | |
| 5 | 0.35 | 0.1 | 0.4 | B | A | |
| 6 | 0.35 | 0.2 | 0.9 | A or B | A | |
| 7 | 0.50 | 0.3 | 0.9 | A | B | burrs |
| 8 | 0.60 | 0.3 | 0.9 | A | B | fused surface, burrs |
| 9 | 0.35 | 0.2 | 1.4 | B | A | |

Note
(Strength)
A: Evaluated bonding strength is 20 N or greater. Bonding strength of 10 N or greater can be obtained assuredly.
B: Evaluated bonding strength is in a range between 10 N and 20 N. In some cases, only small allowance is secured to exceed the bonding strength of 10 N.
C: In some cases, the bonding strength is below 10 N. There is no reliability to obtain bonding strength of 10 N or greater.
(External Appearance)
A: No defect or abnormality
B: Burr or Fused Surface as indicated in Remarks It is understood from the results that the applied pressure is preferably 0.2 MPa or greater, and is more preferably 0.3 MPa or greater, in which case a bonding strength of 10N or greater can be preferably obtained assuredly. Note that with an applied pressure of 0.4 MPa, the oscillation was disabled.

In addition, it is understood that with the forced amount in the range of 0.9 to 1.4 mm, a bonding strength of 10N or greater can preferably be obtained assuredly.

Additionally, it is understood that the oscillation time is preferably 0.35 sec or longer, and is more preferably 0.6 sec or longer, in which case a bonding strength of 10N or greater can preferably be obtained assuredly.

What is claimed is:

1. An ultrasonic bonding method for bonding a rubber member having a roughened rubber bonding surface of a predetermined roughness and a resin member made of a thermoplastic resin having a roughened resin bonding surface of a predetermined roughness, comprising:
    setting the rubber member and the resin member to form a bonding interface therebetween by connecting the roughened rubber bonding surface and the roughened resin bonding surface;
    applying ultrasonic vibrations to the bonding interface from a side of the rubber member to thereby fuse only the resin member by friction heat generated in the bonding interface and to thereby force fused resin into the rubber member; and
    solidifying the fused resin to mechanically bond the rubber member and the resin member by imparting an anchoring effect produced by entanglement of the rubber member and the resin member in the bonding interface, wherein
    the degree of surface roughness of the roughened resin bonding surface is in a range of Rz10 to 50 μm,
    a hardness of the rubber member is in a range of Hs50 to 80, as measured by Shore A hardness, and
    a thickness of the rubber member in an oscillating direction of ultrasonic vibrations applied is in a range of 0.5 to 5 mm.

2. A rubber/resin ultrasonic bonding method according to claim 1, wherein the hardness of the rubber member is in a range of Hs60 to 70.

3. A rubber/resin ultrasonic bonding method according to claim 1, wherein the thickness of the rubber member is in a range of 0.7 to 1.0 mm.

4. A rubber/resin ultrasonic bonding method according to claim 1, wherein a pressure applied to the bonding interface is in a range of 0.03 to 0.35 MPa.

5. A rubber/resin ultrasonic bonding method according to claim 4, wherein the pressure applied to the banding interface is in a range of 0.2 to 0.3 MPa.

6. A rubber/resin ultrasonic bonding method according to claim 1, wherein a forced amount of the resin that is forced into the rubber member is in a range of 0.2 to 1.4 mm.

7. A rubber/resin ultrasonic bonding method according to claim 6, wherein the forced amount is in a range of 0.4 to 0.9 mm.

8. A rubber/resin ultrasonic bonding method according to claim 1, wherein an oscillation time is in a range of 0.2 to 1.0 second.

9. A rubber/resin ultrasonic bonding method according to claim 8, wherein the oscillation time is in a range of 0.35 to 0.6 second.

10. A rubber/resin ultrasonic bonding method according to claim 1, wherein the resin is solidified by holding a state after the resin member has been fused in the previous resin fusing step for on the order of 0.5 to 1.0 second.

11. A rubber/resin ultrasonic bonding method according to claim 1, wherein the roughened rubber bonding surface is made to have a mesh size of 100 or less.

12. A rubber/resin ultrasonic bonding method according to claim 11, wherein the roughened rubber bonding surface is made to have a mesh size of 60 or less.

13. A rubber/resin ultrasonic bonding method according to claim 1, wherein the roughened rubber bonding surface is formed by transferring a surface of a mold to which a blast finishing is applied.

* * * * *